(12) United States Patent
Randall et al.

(10) Patent No.: US 9,649,879 B2
(45) Date of Patent: May 16, 2017

(54) HIGH LOAD CAPACITY WHEEL FORCE TRANSDUCER

(71) Applicant: Caterpillar Inc., Peoria, IL (US)

(72) Inventors: Kort Randall, Peoria, IL (US);
Nicholas Krueger, Peoria, IL (US);
Daniel Frohberg, Tremont, IL (US);
David Cook, Berthoud, CO (US)

(73) Assignee: Caterpillar Inc., Peoria, IL (US)

( * ) Notice: Subject to any disclaimer, the term of this patent is extended or adjusted under 35 U.S.C. 154(b) by 20 days.

(21) Appl. No.: 14/672,590

(22) Filed: Mar. 30, 2015

(65) Prior Publication Data
US 2016/0288566 A1    Oct. 6, 2016

(51) Int. Cl.
| | |
|---|---|
| *B60B 27/00* | (2006.01) |
| *B60B 27/06* | (2006.01) |
| *G01M 17/013* | (2006.01) |
| *G01L 5/00* | (2006.01) |
| *G01L 5/16* | (2006.01) |

(52) U.S. Cl.
CPC .......... *B60B 27/0068* (2013.01); *B60B 27/06* (2013.01); *G01L 5/0061* (2013.01); *G01L 5/161* (2013.01); *G01M 17/013* (2013.01)

(58) Field of Classification Search
CPC .............. G01L 5/161; G01L 3/00; G01B 7/16
USPC .................................................. 73/862.045
See application file for complete search history.

(56) References Cited

U.S. PATENT DOCUMENTS

| | | | |
|---|---|---|---|
| 4,297,877 A | 11/1981 | Stahl | |
| 5,886,350 A | 3/1999 | Cook et al. | |
| 6,439,063 B1 | 8/2002 | Schnackenberg | |
| 7,716,996 B2 | 5/2010 | Muller et al. | |
| 8,096,173 B2 | 1/2012 | Isono | |
| 8,250,935 B2 * | 8/2012 | Meuter ................. | G01L 3/1457 |
| | | | 73/862.045 |
| 8,607,647 B1 * | 12/2013 | Wilson .................... | G01L 3/104 |
| | | | 73/862.08 |
| 8,640,553 B2 | 2/2014 | Barnett et al. | |
| 8,887,581 B2 * | 11/2014 | Zaaijer ................. | F16C 19/522 |
| | | | 73/862.041 |
| 8,960,011 B2 * | 2/2015 | Nagano ................... | G01L 1/005 |
| | | | 73/760 |
| 2014/0331789 A1 | 11/2014 | Shimoyama | |

FOREIGN PATENT DOCUMENTS

| | | |
|---|---|---|
| DE | 10250320 A1 | 5/2004 |
| JP | 2010151676 A | 7/2010 |

* cited by examiner

*Primary Examiner* — Lisa Caputo
*Assistant Examiner* — Octavia Hollington
(74) *Attorney, Agent, or Firm* — Miller, Matthias & Hull (57) ABSTRACT

The disclosure is directed to a wheel force transducer mountable on a rotatable wheel in a machine, where the wheel force transducer includes an inner flange configured to be connected to an axle shaft of the machine, an outer flange configured to be connected to the wheel of the machine, a tube connected to the inner flange on one end and connected to the outer flange on the other end; and at least one force sensor mounted on the tube, where at least one force sensor is configured to provide data for at least one of the forces and moments subjected to the wheel.

20 Claims, 11 Drawing Sheets

FIG. 11

HIGH LOAD CAPACITY WHEEL FORCE TRANSDUCER

TECHNICAL FIELD

The disclosure relates, in general, to an apparatus for measurement of forces and/or moments of a rotatable member, and more specifically to a wheel force measurement system to measure forces and/or moments of a wheel mounted on a machine.

BACKGROUND

The operating performance of a machine such as an off-road vehicle, dump truck, material handler, etc. is dependent on the forces, such as contact pressure, between the wheels of the machine and the surface of the ground through a tire. The forces on the wheel affect the contact pressure. To monitor the forces on a wheel, a force monitoring device is typically attached to the wheel. The device rotating together with the wheel partially measures some of the forces applied on the wheel. An example of such a force monitoring device is disclosed in U.S. Pat. No. 8,096,173 (hereafter "the '173 patent"), entitled "Tire Action Force Detecting Device." The '173 patent is generally directed to an apparatus to detect a force acting on a tire, based on a stress on a connection mechanism that connects a wheel and a wheel supporting member.

The device disclosed in the '173 patent is generally applied to a light weight vehicle such as an automobile. A conventional force measurement device as in the '173 patent is designed to capture forces through a wheel during rotation of the wheel in a vehicle. However, a conventional force measurement device as in the '173 patent is not designed to fully and accurately capture longitudinal and lateral mechanical forces and moments through the width of a wheel during rotation of the wheel in a heavy duty machine Such known devices are typically designed for measuring a limited number of forces and moments on a wheel of an automobile and do not fully and accurately capture the change of forces occurring during rotation of a wheel, such as in a heavy duty machine.

As a result, there is a need for a device, a process, and a transducer that can capture forces and moments of a wheel more fully and accurately and/or more fully and accurately in a heavy duty machine.

SUMMARY

A heavy duty machine such as an off-road vehicle, dump truck, material handler, etc. carries forces on its wheels, which are sometimes orders of magnitude larger than those on the wheels of an automobile. More accurately measuring forces on the wheels of vehicles, such as a heavy duty machine, requires a device which can more accurately measure longitudinal and lateral mechanical forces and moments of the wheels. For example, because a wheel of a heavy duty machine is proportionally larger with respect to the size of the machine, the width of the wheel is larger as well.

In one aspect, the disclosure is directed to a wheel force transducer mountable on a rotatable wheel in a machine, the wheel force transducer including an inner flange configured to be connected to an axle shaft of the machine, an outer flange configured to be connected to the wheel of the machine, a tube connected to the inner flange on one end and connected to the outer flange on the other end, and at least one force sensor mounted on the tube where the at least one force sensor is configured to provide data for at least one of forces and moments subjected to the wheel.

In another aspect, the disclosure is directed to a wheel force measurement system, the wheel force measurement system including an inner flange configured to be connected to an axle shaft of a machine, an outer flange configured to be connected to a wheel, a tube connected to the inner flange on one end and connected to the outer flange on the other end, at least one force sensor mounted on the tube where the at least one force sensor is configured to provide data for at least one of forces and moments subjected to the wheel, a wheel flange configured to mechanically connect the outer flange to the wheel, and a data acquisition system communicatively connected to the at least one sensor to process the data for at least one of forces and moments subjected to the wheel.

In another aspect, the disclosure is directed to a method of measuring forces and moments of a rotatable wheel of a machine, the method including mounting a wheel force transducer on the wheel where the wheel force transducer includes an inner flange configured to be connected to an axle shaft of the machine, an outer flange configured to be connected to the wheel, and a tube connected to the inner flange on one end and connected to the outer flange on the other end. The method further includes arranging at least one sensor on the tube, mechanically connecting the inner flange of the wheel force transducer to the machine, and communicatively connecting the sensor to a data acquisition system where the wheel force transducer is configured to provide data for at least one of forces and moments subjected to the wheel.

DETAILED DESCRIPTION OF THE DISCLOSURE

The particular values and configurations discussed in these non-limiting examples can be varied and are cited merely to illustrate at least one aspect and are not intended to limit the scope thereof.

Figure 1:
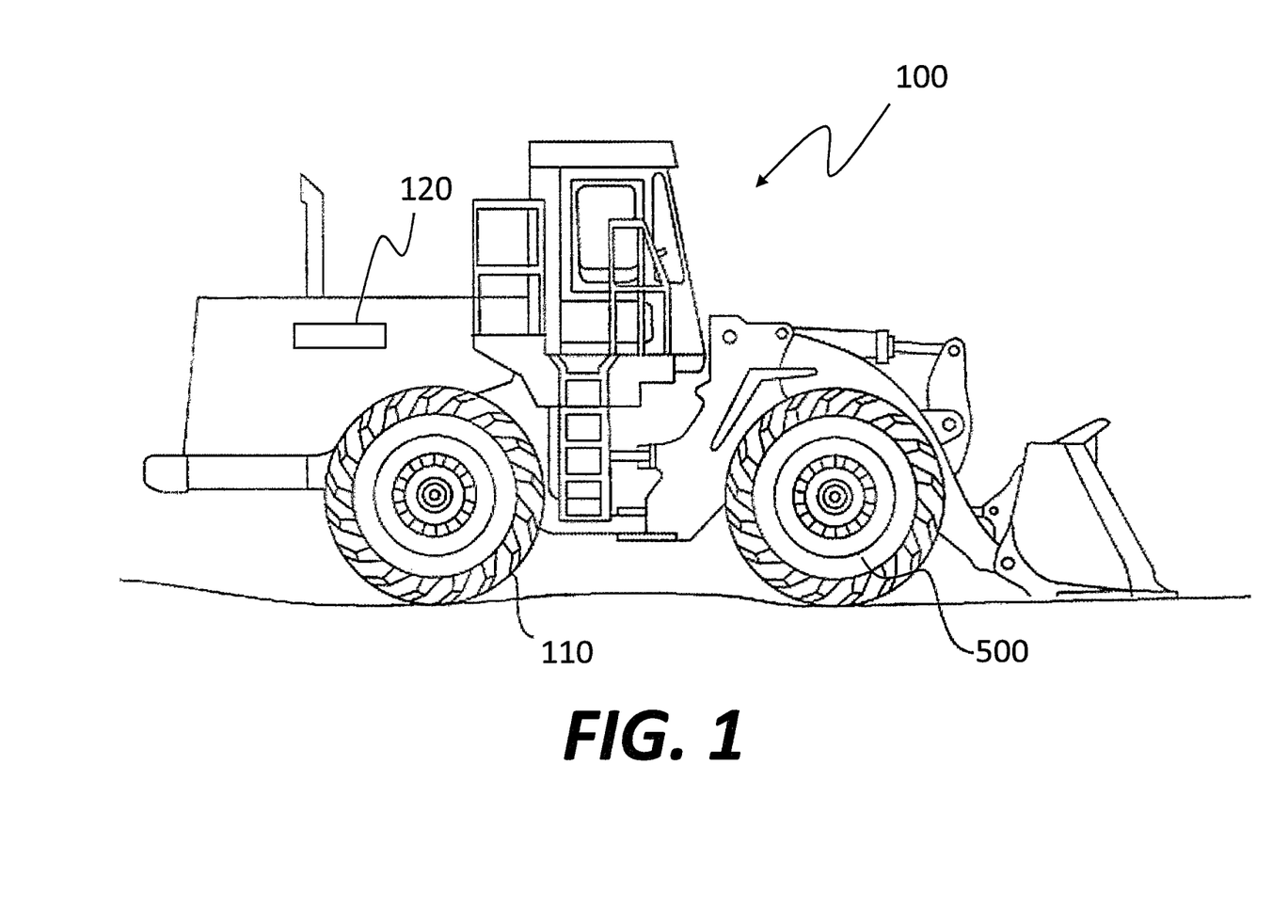
FIG. 1 illustrates an exemplary machine equipped with a plurality of wheels to which a wheel force measurement system is connected according to an aspect of the disclosure.

Referring to the drawing, and initially to FIG. 1, an illustrative, but nonlimiting example of a machine 100 is shown. The machine 100 is a load-hauling machine having wheels 500 and tires 110 in contact with the ground. The machine 100 may include an Electronic Control Module (ECM) 120. Although a load-hauling machine 100 is disclosed, the disclosure may be applicable to virtually any type of machine that moves through the rotation of wheels 500 including track type vehicles.

Figure 2:
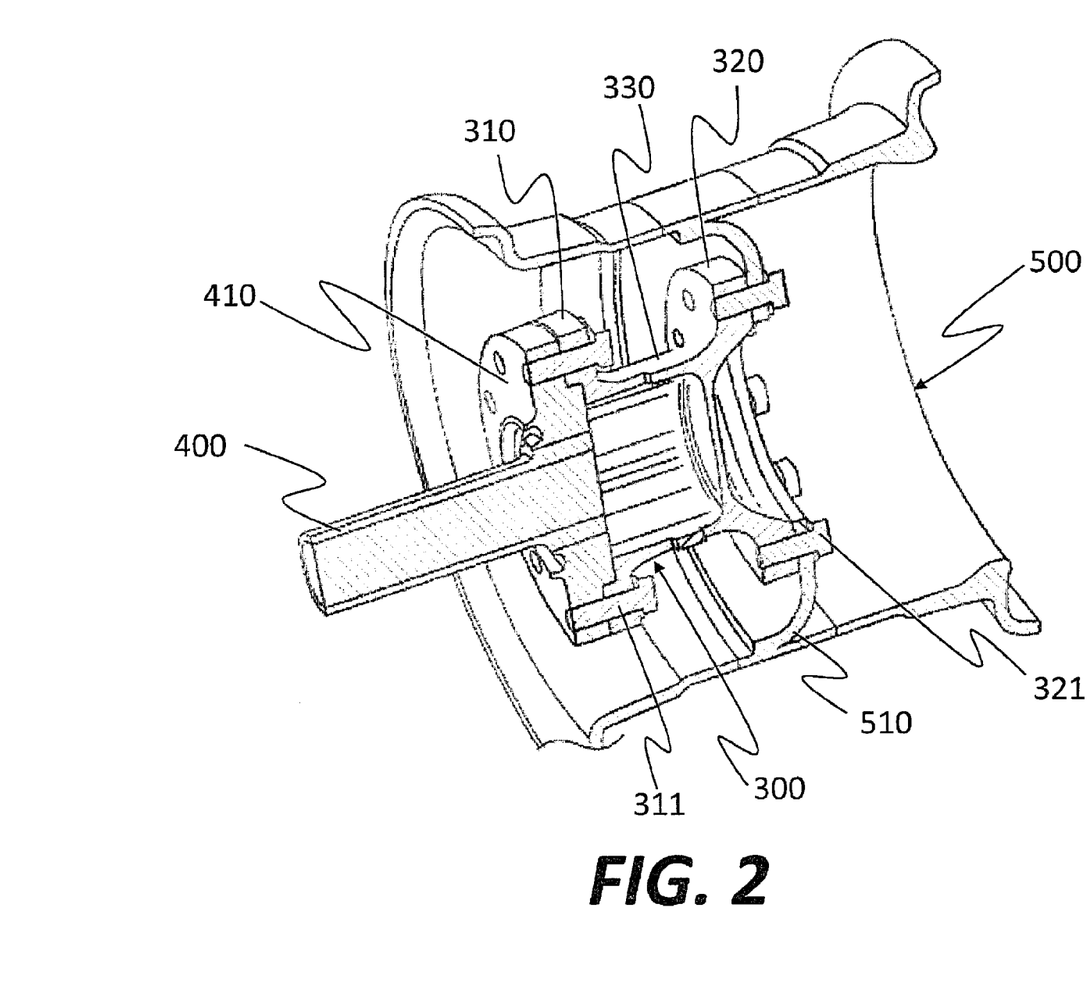
FIG. 2 illustrates a cross-sectional view of an exemplary wheel force transducer for measuring force and moment components according to certain aspects of the disclosure.

FIG. 2 illustrates a cross-sectional view of an exemplary wheel force transducer 300 for measuring force and moment components according to certain aspects of the disclosure. The wheel force transducer 300 includes an inner flange 310, an outer flange 320, and a tube 330 arranged between the inner flange 310 and the outer flange 320. The wheel force transducer 300 may be secured to the axle shaft 400 of the machine 100 and to an inner side of wheel flange 510. Other attachments are contemplated as well. In one aspect, the inner flange 310 may be configured to connect the wheel force transducer 300 to the axle shaft 400. In some aspects, the inner flange 310 may be mechanically coupled to the axle shaft flange 410 via a coupling 311 such as bolt, stud, nut, fastener or the like. The outer flange 320 may be configured to connect the wheel force transducer 300 to the wheel flange 510. In some aspects, the outer flange 320 may be mechanically coupled to the inner side of the wheel flange 510 via a coupling 321 such as bolt, stud, nut, fastener, or the like. The wheel force transducer 300 is thus mechanically connected to a portion of the wheel 500 and carries force and moment loads between the axle shaft 400 and the wheel 500. This ensures a more accurate measurement of force and moment.

The cross-sections of the various components in FIG. 2 have not been taken as planar sections through the respective components, and are provided with some distortion of the cross-sectional plane in order to more simply illustrate the construction. For example, FIG. 2 depicts a portion of the full circular cross-sections of the inner flange 310, the outer flange 320, and the tube 330 to illustrate the connections among these components. It should be understood that various forms of transducers are contemplated and may be incorporated in a manner as taught herein.

Figure 3:
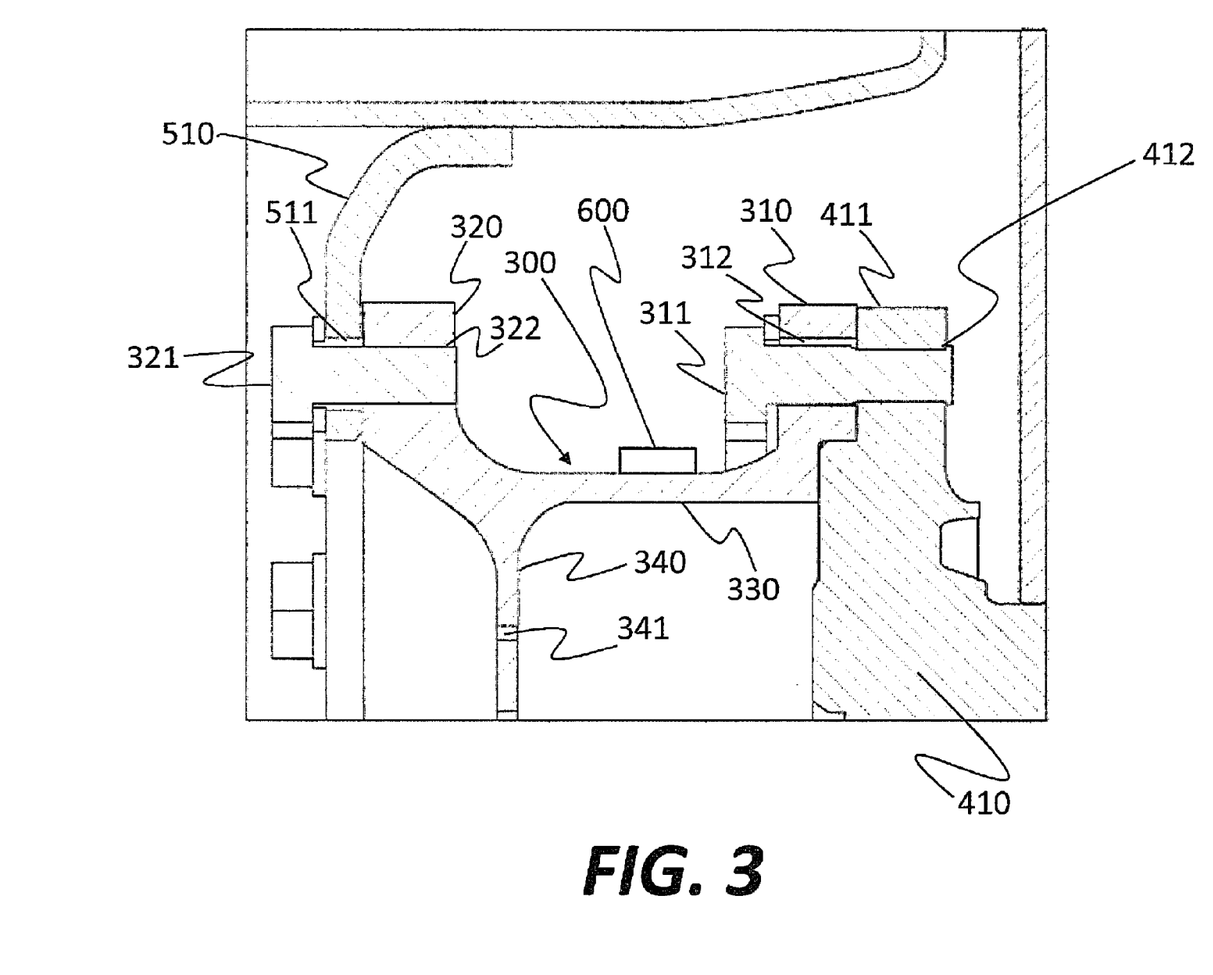
FIG. 3 illustrates a partial cross-section view of the wheel force transducer in FIG. 2.

FIG. 3 illustrates a partial cross-section view of the wheel force transducer 300 in FIG. 2. FIG. 3 shows an axle shaft mounting hole 412 placed along the outer ring 411 of the axle shaft flange 410. In one aspect, the axle shaft flange 410 may have a plurality of axle shaft mounting holes 412 circumferentially distributed along the outer ring 411. In this aspect, the wheel force transducer 300 has an inner flange 310 that includes a mounting hole 312 that is configured to mate with the axle shaft mounting hole 412 via the coupling 311. In one aspect, the inner flange 310 may have a plurality of mounting holes 312 that are configured to mate with the axle shaft mounting holes 412. The inner flange 310 may be clamped to the outer ring 411 of the axle shaft flange 410 by the coupling 311 that extends through the inner flange 310 and the outer ring 411. In addition, the wheel force transducer 300 may have an outer flange 320 with a mounting hole 322 to mate with the wheel flange mounting hole 511 of the wheel flange 510. In one aspect, the outer flange 320 may have a plurality of mounting holes 322 configured to mate with a plurality of mounting holes 511 of the wheel flange 510. In certain aspects, the outer flange 320 may be clamped to the wheel flange 510 by a wheel bolt 321 that extends through the wheel flange mounting hole 511 and the outer flange mounting hole 322.

The wheel force transducer 300 may have a wall flange 340, which is arranged across the diameter of the tube 330. The wall flange 340 may be located near the outer flange 320. In one aspect, the wall flange 340 may be located closer to the outer flange 320 than to the inner flange 310. In some aspects, the wall flange 340 may include one or more wire holes 341 to guide wires extending from sensors 600 attached to the tube 330. The outer surface of the tube 330 may be configured such that a plurality of sensors 600 can be attached. In one aspect, both the outer surface and the inner surface of the tube 330 may be configured such that a plurality of sensors 600 can be attached.

Figure 4:
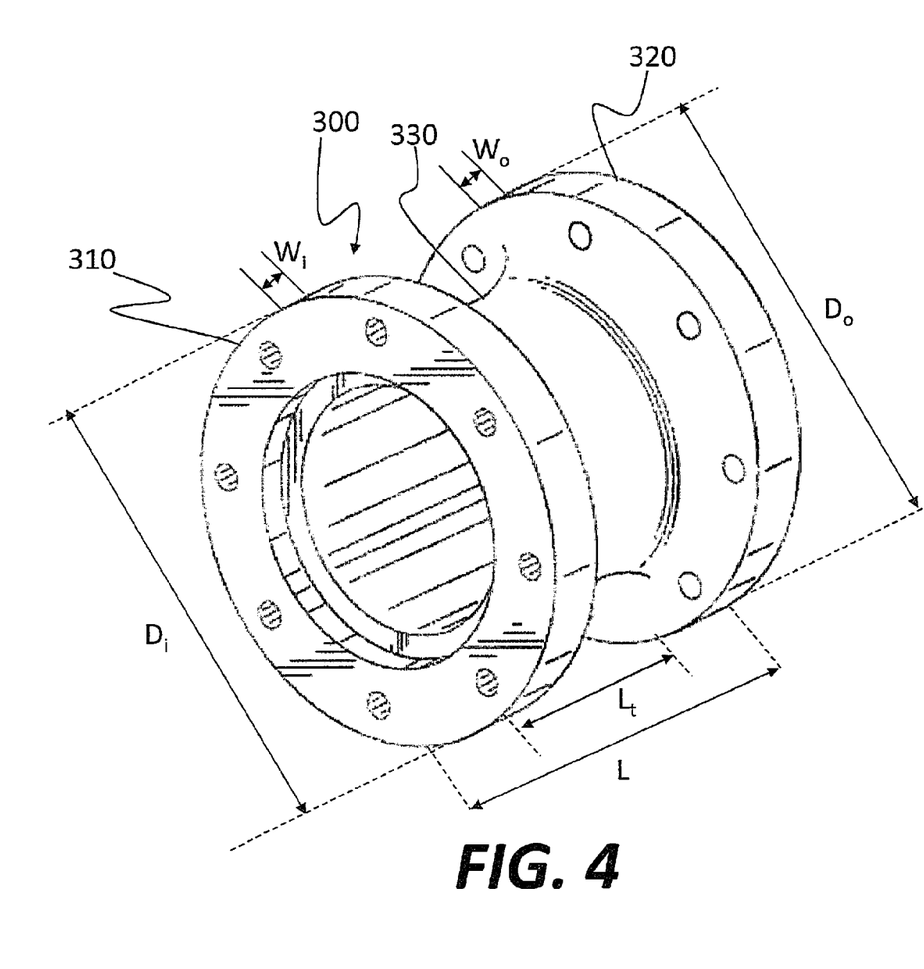
FIG. 4 illustrates a perspective view of an exemplary wheel force transducer according to certain aspects of the disclosure.

FIG. 4 illustrates a perspective view of the wheel force transducer 300 according to certain aspects of the disclosure. The diameter ($D_o$) of the outer flange 320 and the diameter ($D_i$) of the inner flange 310 may be determined by the size of the wheel 500, the size of the axle shaft 400, the length ($L_t$) of tube 330 and the length (L) of the wheel force transducer 300. In one aspect, the width ($W_o$) of the outer flange 320 may be equal to or thicker than the width ($W_i$) of inner flange 310. In certain aspects, the length ($L_t$) of the tube 330 may be long enough for a torque tool (not shown for clarity) to be placed between the outer flange 320 and the inner flange 310. In another aspect, the tube 330 may be configured to provide uniform strain fields that linearly respond to applied loads.

Figure 5:
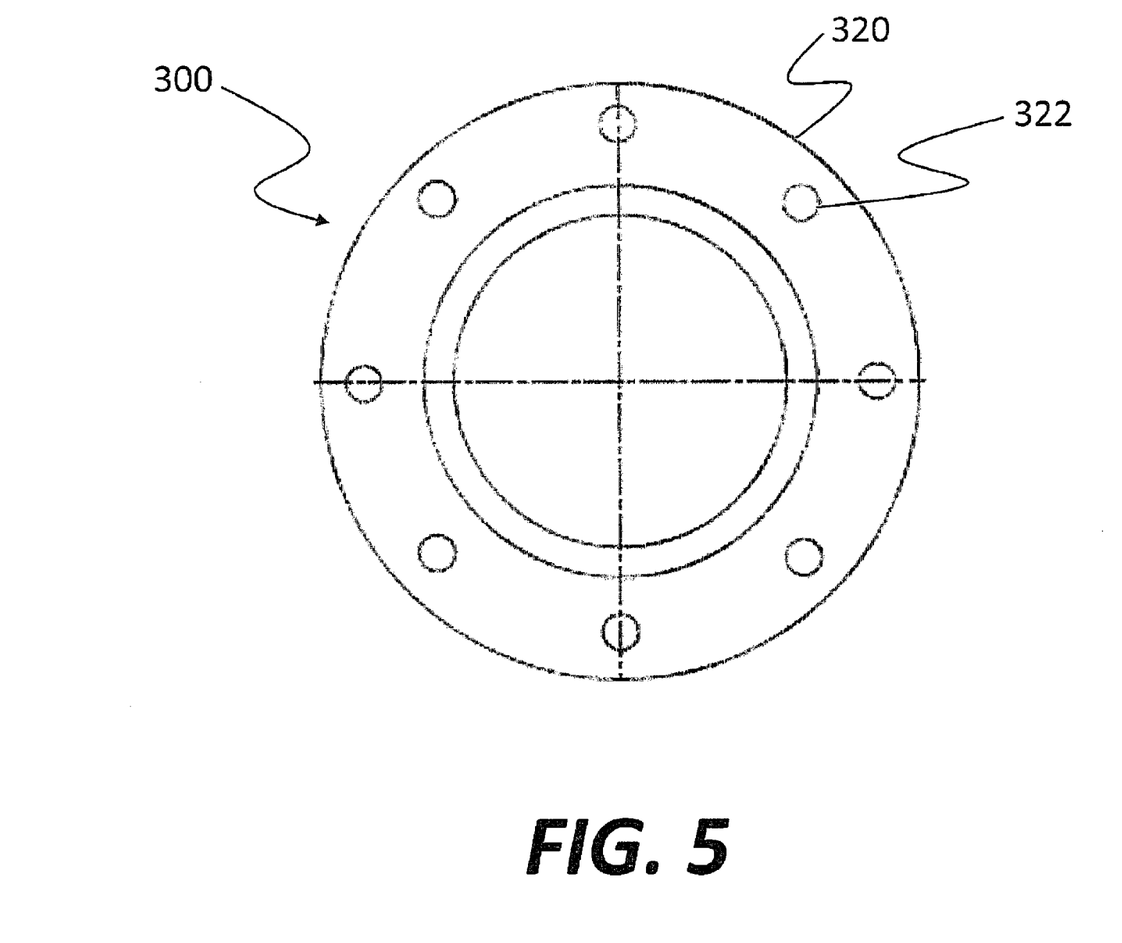
FIG. 5 illustrates a front view of the outer flange according to certain aspects of the disclosure.

FIG. 5 shows a front view of the outer flange 320 of the wheel force transducer 300 according to certain aspects of the disclosure. In this aspect, the outer flange 320 may have a plurality of mounting holes 322 evenly distributed along the circumference of the outer flange 320 to accommodate the coupling 321 (shown in FIG. 2). The outer flange 320 may be secured to the wheel flange 510 (shown in FIG. 2) using the coupling 321. The coupling 321 may include bolts, nuts, studs, fasteners or the like for a particular wheel flange 510 (shown in FIG. 2).

Figure 6:
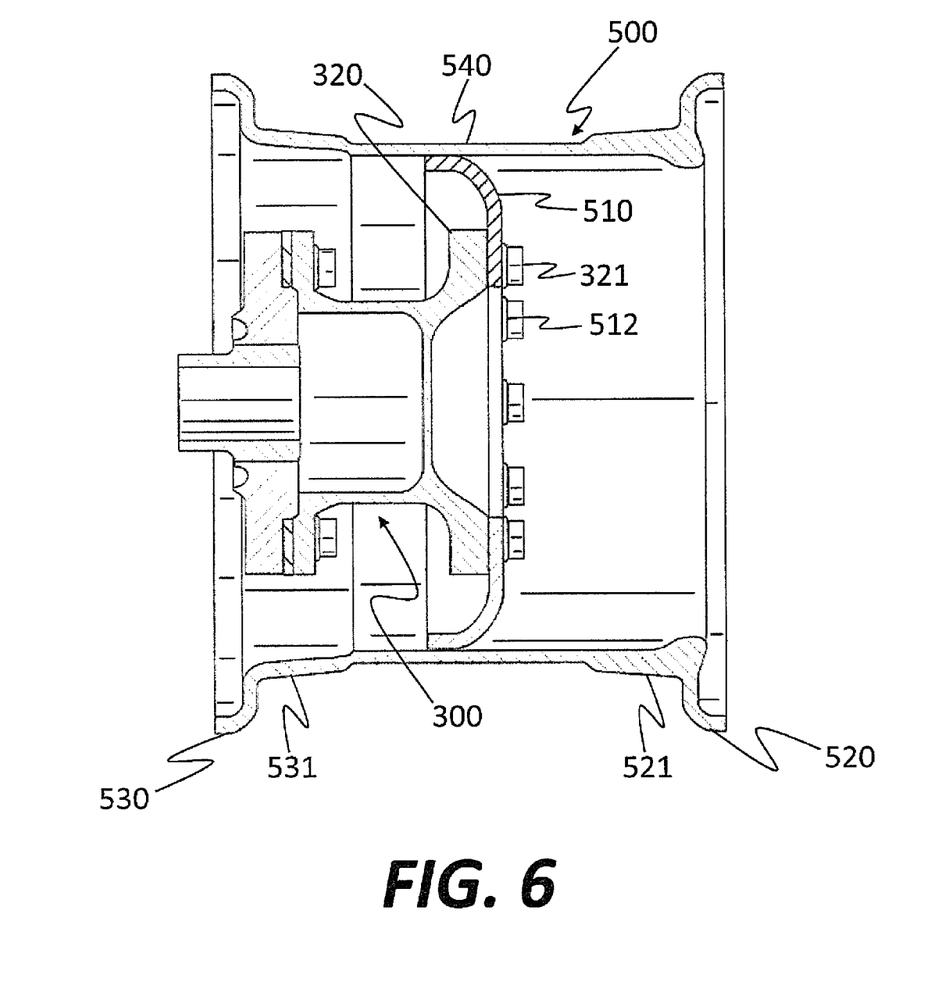
FIG. 6 illustrates a cross-sectional view of an exemplary wheel force transducer and a corresponding wheel according to an exemplary aspect of the disclosure.

FIG. 6 illustrates a cross-sectional view of the wheel force transducer 300 and the corresponding wheel 500 according to an exemplary aspect of the disclosure. The wheel 500 may have a cylindrical shape having different cross sections. A wheel outer rim 520 and a wheel inner rim 530 may be formed circumferentially at outer-side and inner-side opening and edges, respectively. An outer-side bead seat 521 and an inner-side bead seat 531 may be formed continuously with the wheel outer and inner rims 520, 530, respectively, to allow respective beads of a tire 110 (shown in FIG. 1) to be seated on the outer-side and inner-side bead seat 521, 531. A groove-shaped well 540 extending in an inward direction may be formed circumferentially between the outer-side bead seat 521 and the inner-side bead seat 531 so the tire 110 can be mounted via the beads of the tire 110 with respect to the well 540.

The wheel 500 may include a wheel flange 510. In one aspect, the wheel flange 510 may be in the shape of disc. The wheel flange 510 may include a hub mounting portion 512. In certain aspects, the wheel 500 may have a fitting configuration where the wheel flange 510 is arranged inside the well 540 of the wheel 500 so that the well 540 and the wheel flange 510 are integrated with each other by a coupling process such as bonding, welding, or the like. The outer flange 320 of the wheel force transducer 300 may be mechanically connected to the wheel flange 510 using the coupling 321.

Figure 7:
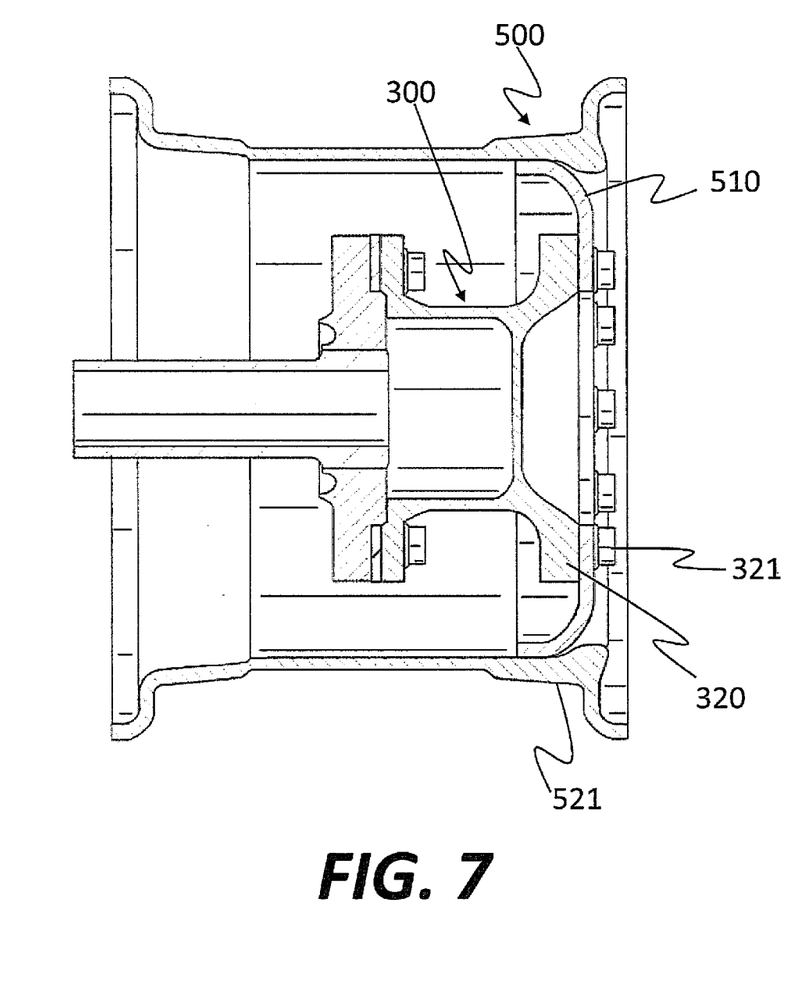
FIG. 7 illustrates a cross-sectional view of the wheel force flange and the wheel according to another exemplary aspect of the disclosure.

FIG. 7 illustrates a cross-sectional view of the wheel force transducer 300 and the wheel 500 according to another exemplary aspect of the disclosure. In this aspect, the wheel 500 may have a fitting configuration where the wheel flange 510 is arranged inside the outer-side bead seat 521 of the wheel 500 so that the outer-side bead seat 521 and the wheel flange 510 are integrated with each other by a coupling process such as bonding, welding, or the like. The outer flange 320 of the wheel force transducer 300 may be mechanically connected to the wheel flange 510 using the a coupling 321.

Figure 8:
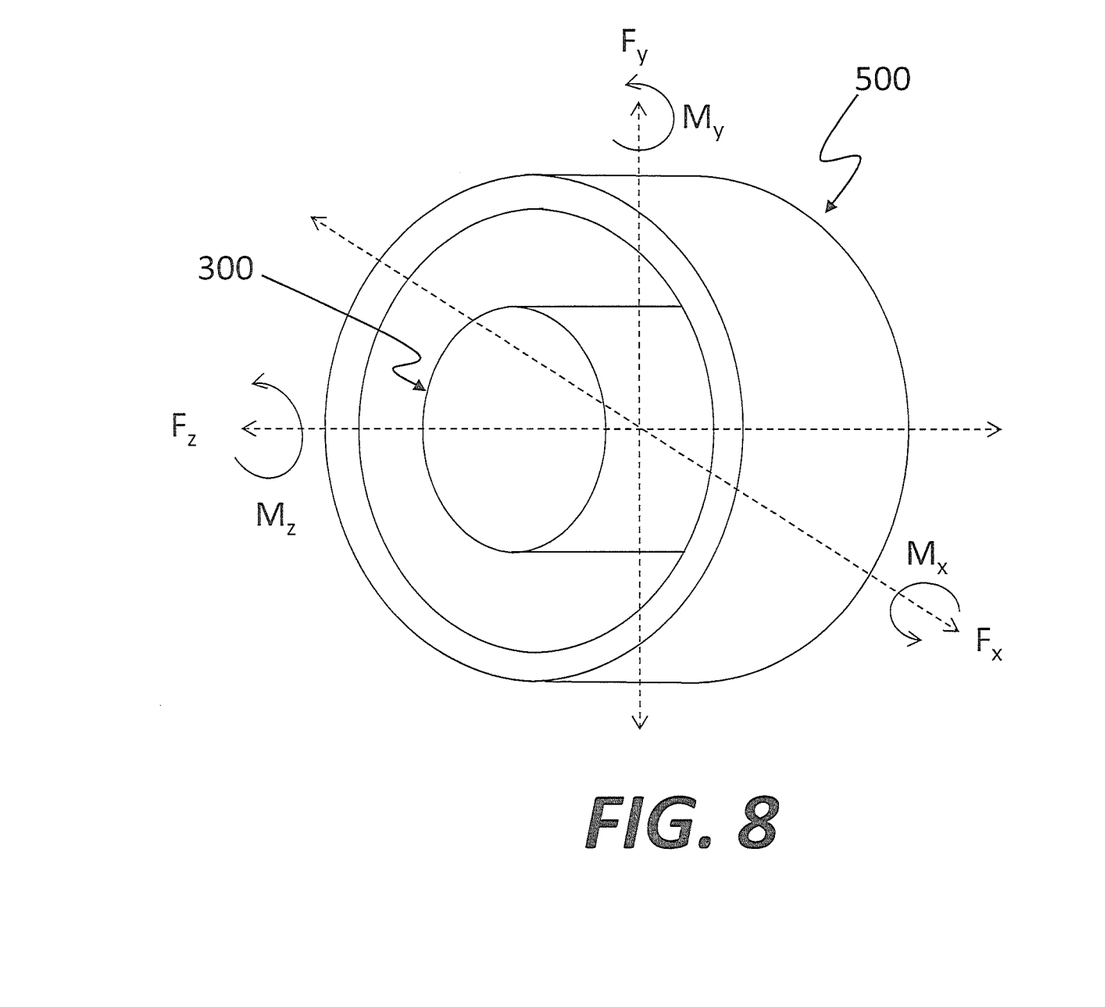
FIG. 8 illustrates a wheel force transducer with respect to the coordinate axes, showing forces and moments of a wheel according to certain aspects of the disclosure.

FIG. 8 illustrates a wheel force transducer 300 with respect to the coordinate axes, showing forces and moments of a wheel 500 according to certain aspects of the disclosure. The axes X, Y, and Z, and the associated force vectors $F_x$, $F_y$, $F_z$ are orthogonal to each other and are defined relative to the wheel 500 mounted on the machine 100 (FIG. 1). The force $F_x$ may be aligned with the longitudinal direction of the wheel 500. The force $F_y$ may be aligned with the vertical direction of the wheel 500. The force $F_z$ may be aligned with the lateral direction of the wheel 500. Three moments $M_x$, $M_y$, & $M_z$ may be defined around the longitudinal direction of the force vector $F_x$, the vertical direction of the force vector $F_y$, and the lateral direction of the force vector $F_z$ respectively. These notations are arbitrary definitions and may be reversed in some other aspects without departing from the disclosure.

Figure 9:
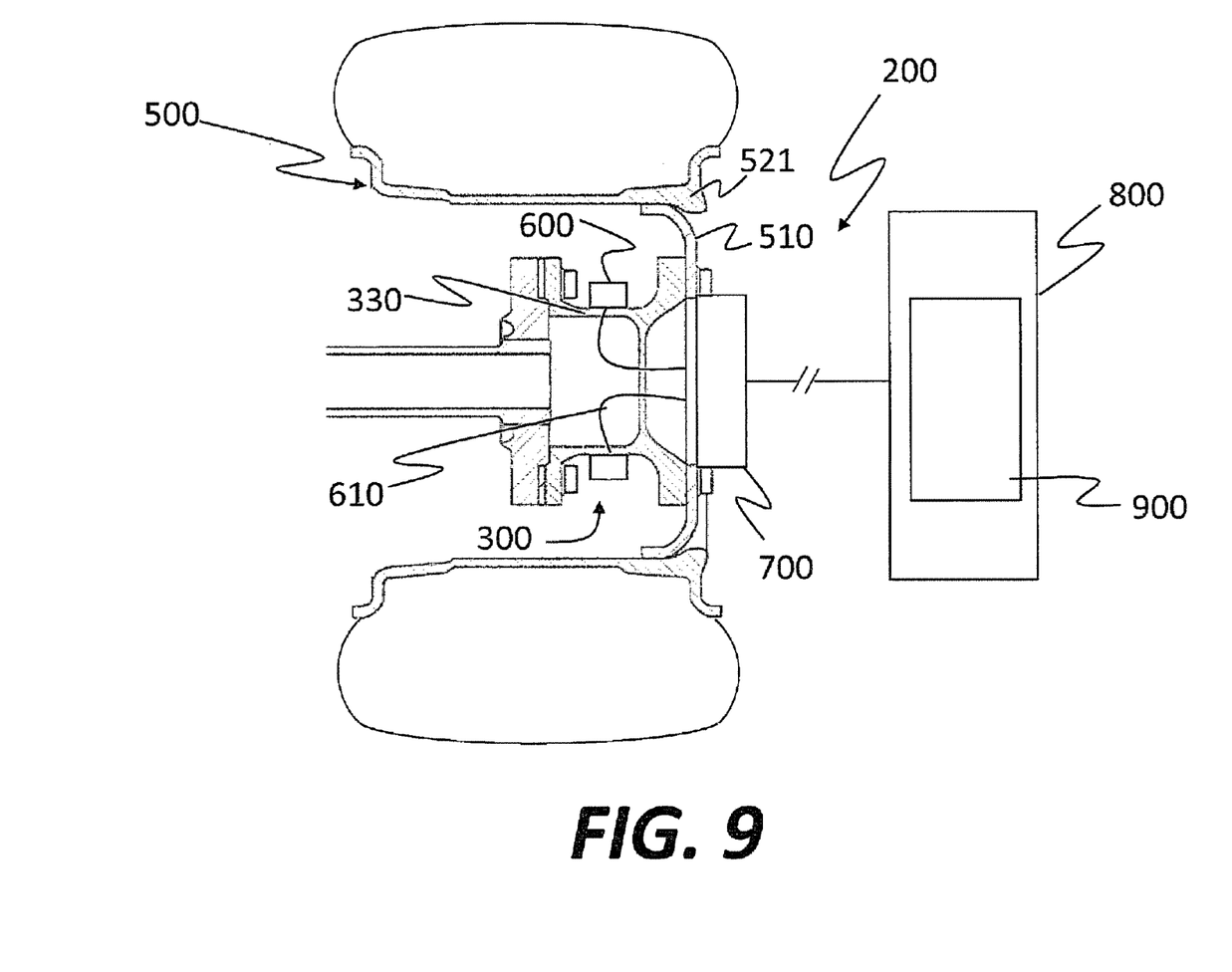
FIG. 9 illustrates an exemplary configuration of wheel force measurement system according to certain aspect of the disclosure

FIG. 9 illustrates an exemplary configuration of wheel force measurement system 200 according to certain aspect of the disclosure. The wheel force measurement system 200 may include sensors 600 and the wheel force transducer 300. The wheel force measurement system 200 may further include an electronics housing 700, and data acquisition system 800.

The sensors 600 may be configured to be attached to any place of the wheel force transducer 300 including the tube 330, the inner flange 310, and the outer flange 320. In one aspect, the sensors 600 may be configured to be attached to the tube 330. At least one of the sensors 600 is configured to measure one or more of the force vectors $F_x$, $F_y$, $F_z$ and the moments $M_x$, $M_y$, $M_z$ of the wheel 500 through the wheel force transducer 300. In one aspect, at least one of the sensors 600 may include one or more strain gauges, strain gauge amplifiers, analog-to-digital converters, and signal processors that are configured to measure a strain sensed by the strain gauges and provide an output signal that includes at least one signal representative of at least a portion of the measurement. Moreover, the sensors 600 may include temperature compensating features. In some aspects, the sensors 600 may be connected to sensor wires 610 which are further connected to the electronics housing 700 and/or the data acquisition system 800. A wireless connection between the sensors 600 and the electronic housing 700 is also contemplated using a communication channel as defined herein along with repective transceivers.

The wheel force measurement system 200 may include a wheel 500 which includes a wheel flange 510 configured to be connected to the wheel force transducer 300. The location of the wheel flange 510 may be adjusted for the wheel force transducer 300 to better represent the actual machine's tire 110 with respect to the center of machine 100. In one aspect, the wheel flange 510 may be fitted inside the outer-side bead seat 521 of the wheel 500 so that the outer-side bead seat 521 and the wheel flange 510 are integrated with each other.

After the wheel 500 is mounted to the wheel force transducer 300, an electronics housing 700 may be mounted on the wheel 500. In one aspect, the sensor wiring 610 may be used to provide signals to the electronics housing 700 for signal conditioning. The electronics housing 700 may be communicatively connected to the data acquisition system 800. The data acquisition system 800 may include one or more computing systems 900 in communication with the electronics housing 700 via one or more communications networks communicating over a communication channel as defined herein. The computing systems 900 may include standard personal computers or workstations and/or servers. The computing systems 900 may be configured to execute machine-readable media to process data obtained through the wheel force transducer 300 and the sensors 600. The data and processing results may be displayed on a user interface and/or stored on media within the data acquisition system 800 for further review and analysis. It is further contemplated that the electronics housing 700 and the data acquisition system 800 may be integrated. In another aspect, the electronics housing 700 and the data acquisition system 800 may be located elsewhere or integrated with the ECM 120 (shown in FIG. 1).

Figure 10:
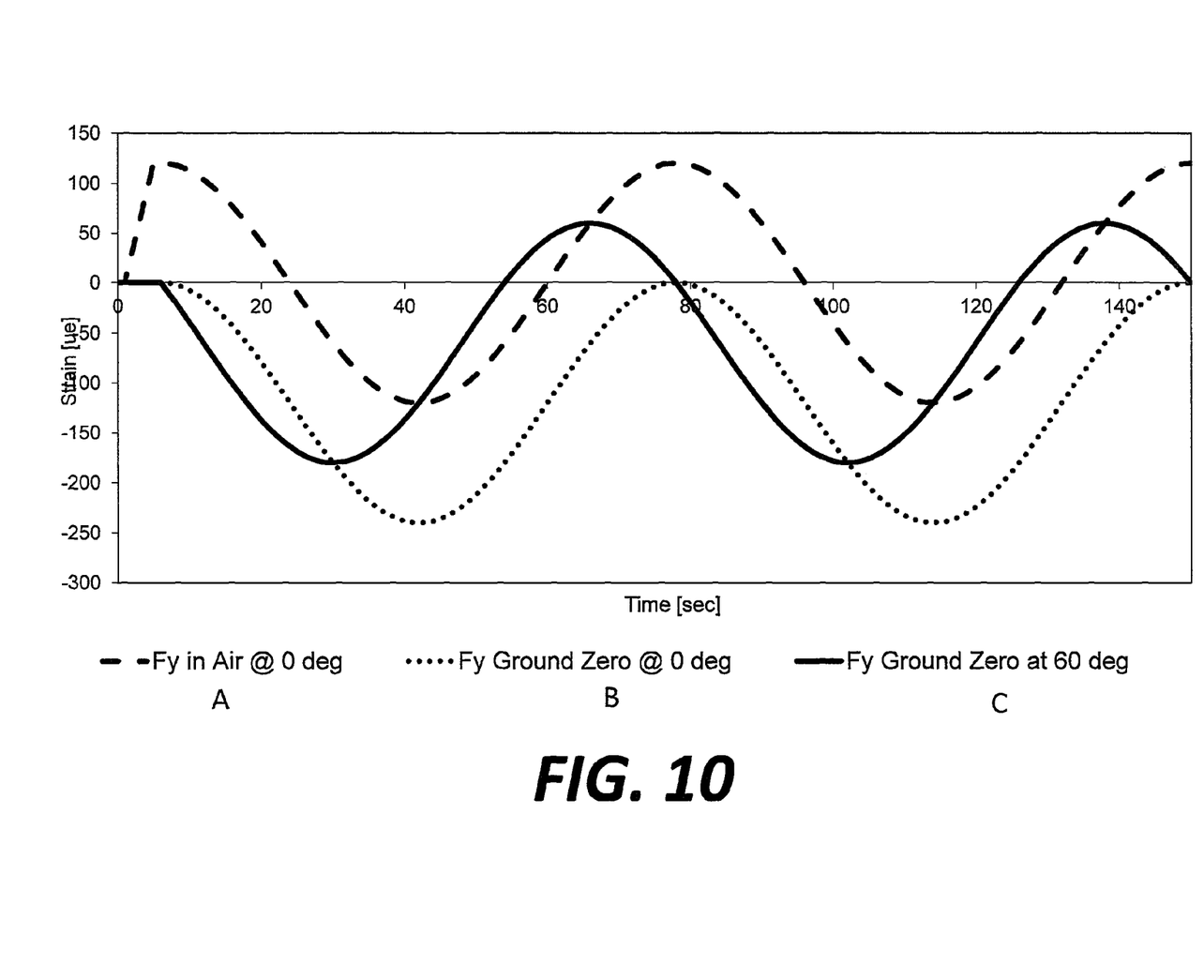
FIG. 10 shows exemplary strain plots A, B, C obtained via a wheel force transducer to determine a force $F_y$ during rotation of a wheel in various conditions according to certain aspects of the disclosure.

The initial conditions of the wheel 500 may affect the values obtained from the sensors 600. The strains measured by the sensors 600 are utilized to calculate the forces $F_x$, $F_y$, $F_z$ and moments $M_x$, $M_y$, & $M_z$. FIG. 10 shows exemplary strain plots A, B, C obtained via the wheel force transducer 300 according to certain aspects of the disclosure to determine the force $F_y$ during the rotation of the wheel 500 in various conditions. In strain plot A, the strain used to determine the force $F_y$ is illustrated in the case where the rotation of the wheel 500 starts at 0° degree rotation angle and in the air without a preload. In this manner, the cyclic nature of the strain plot is due to the rotation of wheel 500 even with no external load applied. If the wheel 500 does not begin in the air and experiences a pre-load from the machine 100, as shown by the strain plot B, the load takes effect on the strain by incurring a mean shift with respect to the strain plot A. In addition, in the strain plot C, when the wheel 500 starts at an offset angle from the ideal 0° degree rotation angle in the preloaded condition as illustrated in strain plot B, the offset angle causes an angular phase shift with respect to the strain plots A & B. The data acquisition system 800 is configured to correct the wheel forces $F_x$, $F_y$, $F_z$ and the moments $M_x$, $M_y$, & $M_z$ to reflect the applied preloads and angular offsets.

Figure 11:
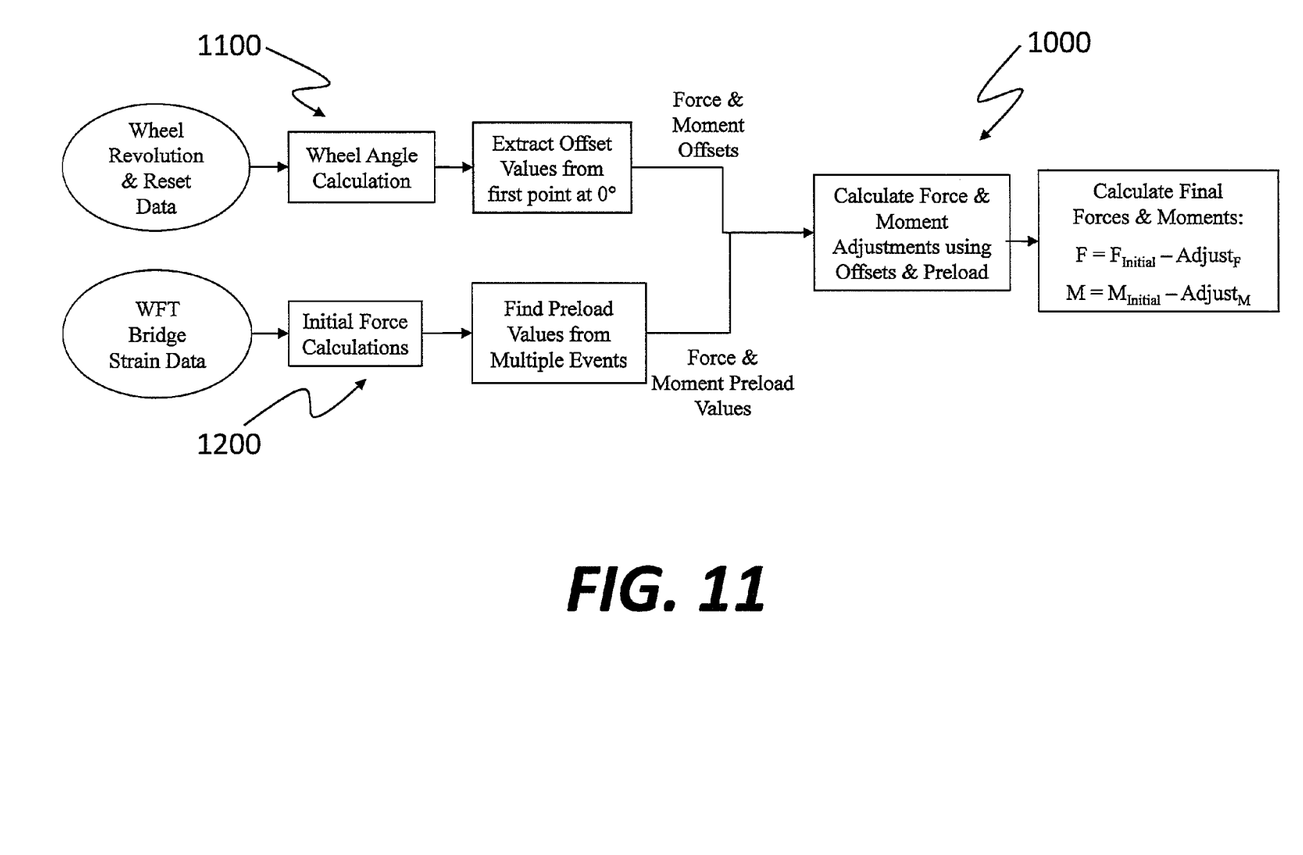
FIG. 11 illustrates an exemplary correction process of the data acquisition system according to certain aspects of the disclosure.

FIG. 11 illustrates an exemplary correction process 1000 of the data acquisition system 800 according to certain aspects of the disclosure. In this aspect, the correction process 1000 includes an angular rotation correction process 1100 and a load correction process 1200. The angular rotation correction process 1100 may be configured to correct the phase shift due to an angular offset from the 0° initial angle. The load correction process 1200 may be configured to determine the forces and moments due to the preload conditions. The data acquisition system 800 is configured to calculate the final forces $F_x$, $F_y$, $F_z$ and moments $M_x$, $M_y$, & $M_z$ by incorporating the angular and load adjustments.

For example, the angular correction process 1100 may analyze a current angular position of a wheel and determine an angular offset value with respect to the 0° initial angle. The load correction process 1200 may determine a preloading condition on the wheel and analyze the forces and moments with respect to the preloading condition. Once the angular offset values and the preloading condition are determined, the correction process 1000 may compensate for the forces and moments with respect to the angular offset values and the preloading condition and calculate the final forces and moments.

INDUSTRIAL APPLICABILITY

The disclosure may be applicable to any machine 100 where measurement of wheel force applied on a wheel 500 of a machine 100 is desired. The wheel force measurement system 200 may include the wheel force transducer 300 mounted on one or more of the wheels of the machine 100. The wheel force measurement system 200 may have one or more sensors 600 attached to the wheel force transducer 300, which are further communicatively connected to the data acquisition system 800 along a communication channel that obtains, in real-time, a wheel condition on which the machine 100 is being operated and analyze the forces and moments of the wheel 500.

The data acquisition system 800 may include one or more computing systems 900 that include any appropriate type of general purpose microprocessor, digital signal processor, microcontroller, dedicated hardware, transceiver (communicating over a communication channel as defined herein), or the like. The computing systems 900 may further include or be connected to the random access memory (RAM), the read-only memory (ROM), a storage device, the network interface and the like. The computing systems 900 may execute sequences of computer program instructions to perform various processes. The computer program instructions may be loaded into the RAM for execution by the processor from the ROM, from a communication channel (wired or wireless), from the storage device and/or the like. The storage device may include any appropriate type of storage provided to store any type of information that the control device may need to perform the processing.

Random access memory (RAM) may store various digital files including the values sensed by the sensor 600. The RAM can be any suitable computer-readable medium. Examples of RAM include, but are not limited to, dynamic random access memory (DRAM), static random access memory (SRAM), ferroelectric random access memory (FRAM), resistive random access memory (RRAM), and diode memory among others. The RAM may provide the sensed values to the processor so that the processor can determine the ground property or type based on the values. The RAM can also store the determined ground condition. The read-only memory (ROM) may store various digital files. Examples of ROM include, but are not limited to, programmable read-only memory (PROM), erasable programmable read-only memory (EPROM), electrically erasable programmable read-only memory (EEPROM), which includes electrically alterable read-only memory (EAROM) and flash memory, and optical storage, such as CD-ROMs, DVDs and the like. The RAM and/or ROM may store the algorithm the processor uses to calculate the forces and moments of the wheel 500. The processor may process the values obtained by the sensor 600 that may be stored in the RAM to determine the wheel condition using the algorithm stored in the ROM or RAM. The processor may compare the sensed values to the database to determine the wheel condition. Examples of processors include computing devices and/or dedicated hardware as defined herein, but are not limited to, one or more central processing units and microprocessors.

The data acquisition system 800 may be separate from the onboard machine control unit or part of the onboard Electronic Control Module (ECM) 120 of the machine 100. The ECM 120 may receive information about the operation of the wheel 500 through a plurality of sensors including the sensors 600 along a communication channel as defined herein. The ECM 120 may use the information from the plurality of sensors 600 to determine the operating conditions of the machine 100. The ECM 120 may control or dictate the parameters by which the machine operates. These ECM 120 controls may be implemented through software instructions.

The wheel force transducer 300 is capable of providing measurement of forces and moments exerted on the wheel 500. The sensors 600 may be placed on various locations in the wheel force transducer 300 to sense signals from the wheel force transducer 300 and the wheel 500. The sensors 600 may include strain gauges, analog-to-digital converters, signal amplifiers, or the like. Moreover, the sensors 600 may include temperature compensating features. In one aspect, the interface between electronics housing 700 and data acquisition system 800 may be configured to include slip rings.

The wheel 500 and the wheel flange 510 may be shaped from a flat metal plate. The flat metal plate may include a flat steel plate, a flat aluminum plate, a flat titanium plate, a flat magnesium plate or the like. In one aspect, the wheel 500 and the wheel flange 510 may be shaped by the same material. Alternatively, one of the wheel 500 and the wheel flange 510 may be shaped from one metal type and the other may be shaped from the different metal type. In some aspect, the wheel 500, the wheel flange 510, and the wheel force transducer 300 may be formed with the same material.

The disclosure is universally applicable for use in a wheel force transducer for many types of off heavy duty machines, such as, for example, machines associated with industries such as mining, construction, farming, transportation, etc. For example, the machine may be an earth-moving machine, such as a track type tractor, track loader, wheel loader, excavator, dump truck, backhoe, motor grader, material handler, etc. Additionally, one or more implements may be connected to the machine, which may be used for a variety of tasks, including, for example, brushing, compacting, grading, lifting, loading, plowing, ripping, and include, for example, augers, blades, breakers/hammers, brushes, buckets, compactors, cutters, forked lifting devices, grader bits and end bits, grapples, moldboards, rippers, scarifiers, shears, snow plows, snow wings, etc.

The disclosure may include communication channels that may be any type of wired or wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an internetwork, a backbone network (BBN), a global area network (GAN), the Internet, an intranet, an extranet, an overlay network, a cellular telephone network, a Personal Communications Service (PCS), using known protocols such as the Global System for Mobile Communications (GSM), CDMA (Code-Division Multiple Access), Long Term Evolution (LTE), W-CDMA (Wideband Code-Division Multiple Access), Wireless Fidelity (Wi-Fi), Bluetooth, and/or the like, and/or a combination of two or more thereof.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

We claim:

1. A wheel force transducer mountable on a rotatable wheel in a machine, comprising:
    an inner flange coupled to an axle shaft flange, the axle shaft flange circumferentially surrounding an end portion of an axle shaft of the machine, and the inner flange positioned axially exterior to the axle shaft and the axle shaft flange;
    an outer flange coupled to a wheel flange of the machine;
    a tube connected to the inner flange at a tube first end and connected to the outer flange at a tube second end, the tube disposed between the axle shaft flange and the wheel flange such that the inner flange, the tube, and the outer flange are positioned axially exterior to the axle shaft, and the tube extends axially away from the axle shaft towards the wheel flange; and
    at least one force sensor mounted on the tube, wherein the at least one force sensor is configured to provide data for at least one of forces and moments subjected to the wheel.

2. The wheel force transducer according to claim 1, further comprising:
    a wall flange arranged inside the tube.

3. The wheel force transducer according to claim 2, wherein the wall flange is located closer to the outer flange with respect to the inner flange.

4. The wheel force transducer according to claim 2, wherein the wall flange includes at least one hole to guide wires from the sensors.

5. The wheel force transducer according to claim 1, wherein a width of the outer flange is equal to or thicker than a width of the inner flange.

6. A wheel force measurement system, comprising:
    an inner flange coupled to an axle shaft flange, the axle shaft flange circumferentially surrounding an end portion of an axle shaft of a machine, and the inner flange positioned axially exterior to the axle shaft and the axle shaft flange;
    an outer flange coupled to a wheel flange;
    a tube connected to the inner flange at a tube first end and connected to the outer flange at a tube second end, the tube disposed between the axle shaft flange and the wheel flange such that the inner flange, the tube, and the outer flange are positioned axially exterior to the axle shaft, and the tube extends axially away from the axle shaft towards the wheel flange;
    at least one force sensor mounted on the tube, wherein the at least one force sensor is configured to provide data for at least one of forces and moments subjected to the wheel;
    the wheel flange configured to mechanically connect the outer flange to the wheel; and
    a data acquisition system communicatively connected to the at least one sensor to process the data for at least one of forces and moments subjected to the wheel.

7. A machine comprising the wheel force measurement system according to claim 6.

8. The wheel force measurement system according to claim 6, further comprising:
    an electronics housing configured to communicatively connect the sensor to the data acquisition system.

9. The wheel force measurement system according to claim 6, wherein the data acquisition system is configured to calculate forces and moments subjected to the wheel based on signals obtained by the sensor during rotation of the wheel.

10. The wheel force measurement system according to claim 9, wherein the data acquisition system is configured to compensate for the forces and the moments of the wheel based on a preload of the wheel.

11. The wheel force measurement system according to claim 9, wherein the data acquisition system is configured to compensate for the forces and the moments of the wheel based on an offset angle of the wheel.

12. The wheel force measurement system according to claim 6, further comprising:
    a wall flange arranged inside the tube.

13. The wheel force measurement system according to claim 12, wherein the wall flange is located closer to the outer flange with respect to the inner flange.

14. A method of measuring forces and moments of a rotatable wheel of a machine, comprising:
    mounting a wheel force transducer on the wheel, wherein the wheel force transducer comprises:
        an inner flange coupled to an axle shaft flange, the axle shaft flange circumferentially surrounding an end portion of an axle shaft of the machine, and the inner flange positioned axially exterior to the axle shaft and the axle shaft flange;
        an outer flange coupled to a wheel flange;
        a tube connected to the inner flange at a tube first end and connected to the outer flange at a tube second end,
    disposing the tube between the axle shaft flange and the wheel flange such that the inner flange, the tube, and the outer flange are positioned axially exterior to the axle shaft, and the tube extends axially away from the axle shaft towards the wheel flange;
    arranging at least one sensor on the tube;
    communicatively connecting the sensors to a data acquisition system,
    wherein the wheel force transducer is configured to provide data for at least one of forces and moments subjected to the wheel.

15. The method according to claim 14, further comprising:
    measuring strain in the wheel force transducer.

16. The method according to claim 14, further comprising:

configuring the data acquisition system to calculate forces and moments of the wheel based on signals obtained by the sensors during rotation of the wheel.

17. The method according to claim 16, further comprising:
configuring the data acquisition system to compensate for the wheel forces and the moments of the wheel based on a preload and an offset angle of the wheel.

18. The method according to claim 14, further comprising:
arranging a wall flange inside the tube.

19. The method according to claim 18, wherein the wall flange is located closer to the outer flange with respect to the inner flange.

20. A wheel force measurement system for a machine, comprising:
a wheel force transducer mounted on at least one rotatable wheel of the machine, wherein the wheel force transducer comprises:
an inner flange coupled to an axle shaft flange, the axle shaft flange circumferentially surrounding an end portion of an axle shaft of the machine, and the inner flange positioned axially exterior to the axle shaft and the axle shaft flange;
an outer flange coupled to a wheel flange of the machine, the outer flange having a width equal to or thicker than a width of the inner flange;
a tube connected to the inner flange at a tube first end and connected to the outer flange at a tube second end, the tube disposed between the axle shaft flange and the wheel flange such that the inner flange, the tube, and the outer flange are positioned axially exterior to the axle shaft, and the tube extends axially away from the axle shaft towards the wheel flange;
a wall flange arranged inside the tube, wherein the wall flange is located closer to the outer flange with respect to the inner flange
at least one force sensor mounted on the tube, wherein the at least one force sensor is configured to provide data for at least one of forces and moments subjected to the wheel and the wall flange includes at least one hole to guide a wire from the at least one force sensor;
a data acquisition system communicatively connected to the at least one sensor to process and calculate the data for at least one of forces and moments subjected to the wheel based on a signal obtained by the at least one force sensor during rotation of the wheel, wherein the data acquisition system is configured to compensate for at least one of forces and moments based on an offset angle of the wheel; and
an electronics housing configured to communicatively connect the sensor to the data acquisition system.

* * * * *